United States Patent [19]

Versteeg

[11] Patent Number: 4,487,483

[45] Date of Patent: Dec. 11, 1984

[54] CATADIOPTRIC OBJECTIVE

[75] Inventor: Frits J. Versteeg, Rotterdam, Netherlands

[73] Assignee: N.V. Optische Industria "De Oude Delft", Delft, Netherlands

[21] Appl. No.: 448,198

[22] Filed: Dec. 9, 1982

[30] Foreign Application Priority Data

Dec. 22, 1981 [NL] Netherlands ............... 8105795

[51] Int. Cl.³ .............................................. G02B 17/08
[52] U.S. Cl. .................................................... 350/444
[58] Field of Search ......................................... 350/444

[56] References Cited

U.S. PATENT DOCUMENTS 4,273,425  6/1981  Canzek ............................... 350/444

Primary Examiner—John K. Corbin
Assistant Examiner—Rebecca D. Gass
Attorney, Agent, or Firm—Louis E. Marn

[57] ABSTRACT

The invention relates to a compact, high-aperture, catadioptric objective. Such an objective comprises a negative lens, a main mirror disposed on the peripheral area of a surface of this lens, a positive front lens, a counter mirror facing the main mirror and disposed on the central area of a surface of the front lens, and a field lens adjacent to the negative lens.

It is an object of the invention to provide a light-weight, low-cost structure for an objective of the above kind, without detoriating the advantageous optical characteristics. This object is achieved by disposing the field lens in spaced relation to the negative lens, while dimensioning the composite objective in such a manner that $$-0.4 < \frac{n_2 - 1}{r_3} + \frac{1 - n_3}{r_8} < -0.05$$

and $$1.46 < (n_1, n_2) < 1.70$$

wherein $n_1$, $n_2$ and $n_3$ are the refractive indices of the front lens, the negative lens and the field lens respectively; and $r_8$ and $r_3$ are the radii of curvature of the adjacent surfaces of the field lens and the negative lens respectively.

4 Claims, 1 Drawing Figure

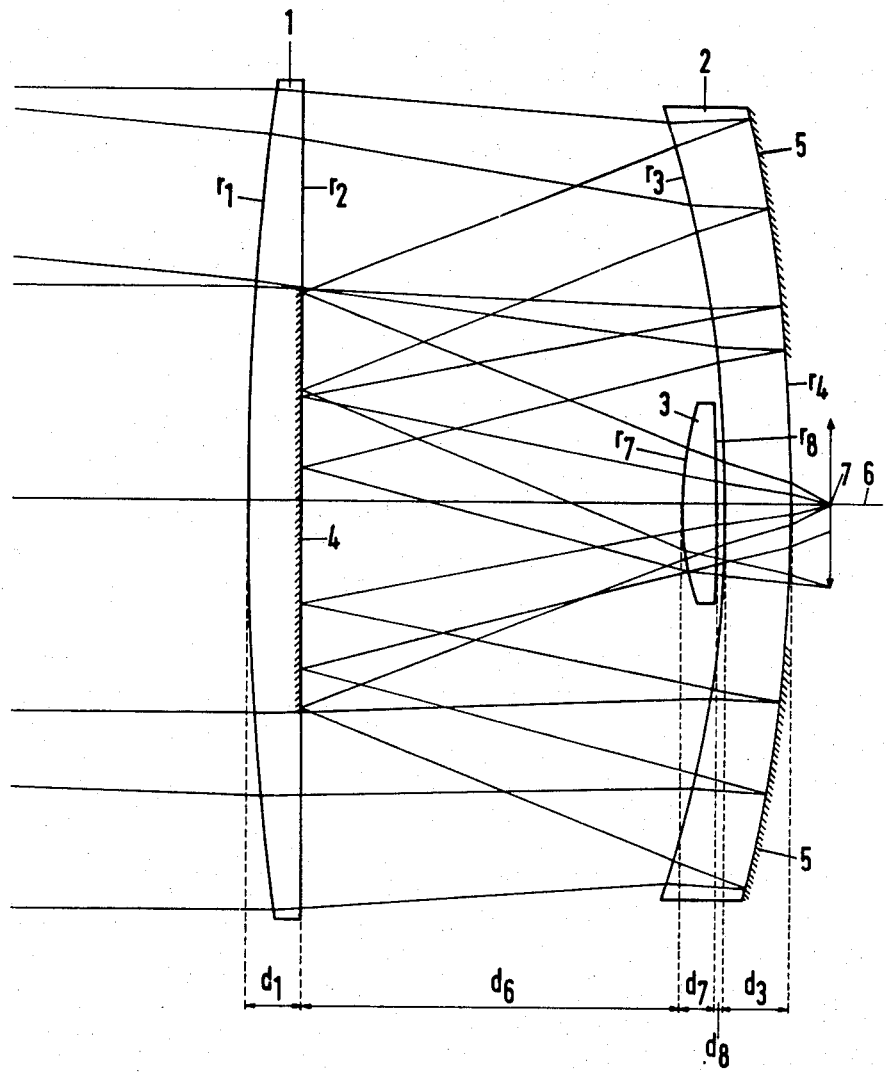

CATADIOPTRIC OBJECTIVE

The invention relates to a catadioptric objective comprising a negative lens, a main mirror disposed on the peripheral area of the surface of the negative lens facing the image side, a positive front lens, a counter mirror disposed on the central area of the surface of the front lens facing the image side, and a field lens mounted adjacent to the negative lens on the object side thereof.

Such a catadioptric objective is known from European Pat. No. 002647.

It is an object of the invention to reduce the weight and cost of a catadioptric objective of this type while maintaining the good characteristics thereof. Such a low-weight objective is particularly suitable for use in telescopes, especially hand-held glasses, such as, for example, night glasses, in which a high aperture is required.

To achieve this object, in accordance with the invention the field lens is mounted in spaced relation to the negative lens and the catadioptric objective satisfies the following conditions:

$$-0.4 < \frac{n_2 - 1}{r_3} + \frac{1 - n_3}{r_8} < -0.05$$

and $$1.46 < (n_1, n_2) < 170$$

wherein $n_1$, $n_2$ and $n_3$ are the refractive indices of the front lens, the negative lens and the field lens respectively, and $r_8$ and $r_3$ are the radii of curvature of the adjacent surfaces of the field lens and the negative lens respectively.

The invention will be described in greater detail hereinafter with reference to the drawing schematically showing a catadioptric objective according to the invention.

As appears from the drawing, the catadioptric objective according to the invention comprises three elements, i.e. a positive front lens 1, a negative lens 2 and a field lens 3 mounted therebetween. The lenses 1, 2 and 3 are centered to have a common optical axis 6.

The negative lens 2 has the peripheral area of its surface facing the image side of the objective provided with a main mirror 5 of annular configuration.

The positive front lens 1 has the central area of its surface facing the image side of the objective provided with a counter mirror 4.

Typical of the invention is, primarily, that the field lens 3 mounted between the positive front lens and the negative lens is spaced from the latter. The distance between the facing surfaces of the negative lens 2 and the field lens 3 is indicated by $d_8$ in the drawing.

In accordance with the invention, the front lens is made of a material having refractive index $n_1$, the negative lens is made of a material having refractive index $n_2$, and the field lens 3 is made of a material having refractive index $n_3$.

Furthermore, the surface of the field lens 3 facing the image side has a radius of curvature $r_8$, while the surface of the negative lens 2 facing the object side has a radius of curvature $r_3$.

In accordance with the invention, not only the field lens is spaced from the negative lens, as stated above, but the objective satisfies the following two conditions:

$$-0.4 < \frac{n_2 - 1}{r_3} + \frac{1 - n_3}{r_8} < -0.05$$

and $$1.46 < (n_1, n_2) < 1.70$$

wherein the different indices and radii are as per the above definitions.

When the catadioptric objective is arranged in a manner satisfying the above conditions, the resultant structure is lighter and cheaper than the prior art structure, while nevertheless the effect achieved by such an objective according to the invention is at least as good as that achieved by the prior art objective.

The focal point of the catadioptric objective is indicated by reference numeral 7 in the drawing.

In accordance with the invention, the distance between the field lens 3 and the negative lens 2 may be selected so that this focal point 7 of the objective is situated outside the negative lens 2 on the image side thereof.

Although it will be clear that different arrangements of the catadioptric objective according to the invention are possible without exceeding the scope defined by the above-described typical characteristics of the invention, two embodiments will be described in greater detail hereinafter.

With $r_1$ and $r_2$ denoting the radii of curvature of the surfaces of the front lens 1 facing the object side and the image side respectively, $r_3$ and $r_4$ those of the negative lens 2 and $r_7$ and $r_8$ those of the field lens 3, in a specific embodiment these radii have the following numerical values:

$r_1 = 3.64692$
$r_2 = \infty$
$r_3 = -1.38651$
$r_4 = -2.06323$
$r_7 = 0.36469$
$r_8 = -2.64195$ In this embodiment, moreover, the different thicknesses of the respective lenses and the distances between these lenses are selected to have specific numerical values. With $d_1$, $d_3$ and $d_7$ denoting the thicknesses, measured on the optical axis 6 of the objective, of the front lens 1, the negative lens 2 and the field lens 3 respectively, $d_6$ denoting the distance, measured on the optical axis 6, between the surface of the front lens 1 facing the image side and the surface of the field lens 3 facing the object side, and $d_8$ denoting the distance, measured on the optical axis 6, between the surface of the field lens 3 facing the image side and the surface of the negative lens 2 facing the object side, these thicknesses and distances respectively should be selected to have the following numerical values:

$d_1 = 0.06$
$d_3 = 0.0742$
$d_6 = 0.4213$
$d_7 = 0.0394$
$d_8 = 0.0106$

It is observed that all of these values are based on a focal length equal to the unit.

As in accordance with the invention, moreover, certain conditions as to the refractive indices of the different materials used for the different lenses have to be satisfied, the front lens 1 is made of BaF3, while the negative lens 2 and the field lens 3 are each made of BK7.

A catadioptric objective arranged in the above manner results in the achievement of the effect contemplated by the invention, i.e. a reduction in weight and cost as compared to the prior art objective.

It is also possible, however, to make the different lenses of so-called optical plastics.

In that case, the radii of curvature, thicknesses and distances defined above are selected to have the following numerical values:

$r_1 = 3.49196$
$r_2 = \infty$
$r_3 = -1.29346$
$r_4 = -2.0333$
$r_7 = 0.34022$
$r_8 = -2.46465$ and $d_1 = 0.06$
$d_3 = 0.0716$
$d_6 = 0.4244$
$d_7 = 0.0392$
$d_8 = 0.0114$ Taking into account the requirements imposed in accordance with the invention on the refractive indices, in this embodiment the front lens is made of SAN while the negative lens 2 and the field lens 3 are each made of acryl.

Again, the numerical values of this embodiment are based on a focal length equal to the unit.

It is observed that by SAN is understood a styreneacrylonitrile copolymer while by acryl is understood polymethylmethacrylate.

It will be clear that the above specific embodiments of the invention are described only by way of example and that a large number of other embodiments are possible too.

It is observed that, although the above refers to and the drawing shows a field lens per se, this lens may well be a composite lens including a field lens as one of its components.

It is further observed that, although the above states that due to the low weight of the catadioptric objective according to the invention this objective is particularly suitable for use in telescopes, especially hand-held glasses such as, for example, night glasses, the catadioptric objective may be used in all cases in which the factor weight plays an essential part, so that the use of the objective according to the invention is by no means limited to the examples given.

I claim:

1. A catadioptric objective comprising a negative lens (2), a main mirror (5) disposed on the peripheral area of the surface of the negative lens facing the image side, a positive front lens (1), a counter mirror (4) disposed on the central area of the surface of the front lens facing the image side, and a field lens (3) mounted adjacent to the negative lens (2) on the object side thereof, characterized in that said field lens (3) is mounted in spaced relation to said negative lens (2) and the catadioptric objective satisfies the following conditions:

$$-0.4 < \frac{n_2 - 1}{r_3} + \frac{1 - n_3}{r_8} < -0.05$$

and $$1.46 < (n_1, n_2) < 1.70$$

wherein $n_1$, $n_2$ and $n_3$ are the refractive indices of the front lens (1), the negative lens (2) and the field lens (3) respectively, and $r_8$ and $r_3$ are the radii of curvature of the adjacent surfaces of the field lens (3) and the negative lens (2) respectively.

2. A catadioptric objective according to claim 1, characterized in that the distance between the field lens (3) and the negative lens (2) is such that the focal point of the catadioptric objective is located outside the negative lens (2) on the image side thereof.

3. A catadioptric objective according to claim 1 or 2, characterized in that the following numerical values apply to the objective:

| | | |
|---|---|---|
| $r_1 = 3.64692$ | and | $d_1 = 0.06$ |
| $r_2 = \infty$ | | $d_3 = 0.0742$ |
| $r_3 = -1.38651$ | | $d_6 = 0.4213$ |
| $r_4 = -2.06323$ | | $d_7 = 0.0394$ |
| $r_7 = 0.36469$ | | $d_8 = 0.0106$ |
| $r_8 = -2.64195$ | | | wherein $r_1$ and $r_2$ are the radii of curvature of the surfaces of the front lens (1) facing the object side and the image side respectively, $r_3$ and $r_4$ are the radii of curvature of the surfaces of the negative lens (2) facing the object side and the image side respectively, $r_7$ and $r_8$ are the radii of curvature of the surfaces of the field lens (3) facing the object side and the image side respectively, $d_1$, $d_3$ and $d_7$ are the thicknesses, measured on the optical axis of the catadioptric objective, of the front lens (1), the negative lens (2) and the field lens (3) respectively, $d_6$ is the distance, measured on said optical axis, between the surface of the front lens (1) facing the image side and the surface of the field lens (3) facing the object side, and $d_8$ is the distance, measured on said optical axis, between the surface of the field lens (3) facing the image side and the surface of the negative lens (2) facing the object side, all of said numerical values being based on a focal length of the catadioptric objective equal to the unit, and wherein the front lens (1) is made of BaF3 and the negative lens (2) and the field lens (3) are each made of BK7.

4. A catadioptric objective according to claim 1 or 2, characterized in that the following numerical values apply to the objective:

| | | |
|---|---|---|
| $r_1 = 3.49196$ | and | $d_1 = 0.06$ |
| $r_2 = \infty$ | | $d_3 = 0.0716$ |
| $r_3 = -1.29346$ | | $d_6 = 0.4244$ |
| $r_4 = -2.0333$ | | $d_7 = 0.0392$ |
| $r_7 = 0.34022$ | | $d_8 = 0.0114$ |
| $r_8 = -2.46465$ | | | wherein $r_1$ and $r_2$ are the radii of curvature of the surfaces of the front lens (1) facing the object side and the image side respectively, $r_3$ and $r_4$ are the radii of curvature of the surfaces of the negative lens (2) facing the object side and the image side respectively, $r_7$ and $r_8$ are the radii of curvature of the surfaces of the field lens (3) facing the object side and the image side respectively, $d_1$, $d_3$ and $d_7$ are the thicknesses, measured on the optical axis of the objective, of the front lens (1), the negative lens (2) and the field lens (3) respectively, $d_6$ is the distance, measured on said optical axis, between the surface of the front lens (1) facing the image side and the surface of the field lens (3) facing the object side, and $d_8$ is the distance, measured on said optical axis, between the surface of the field lens (3) facing the image side and the surface of the negative lens (2) facing the object side, all of said numerical values being based on a focal length of the catadioptric objective equal to the unit, and wherein the front lens (1) is made of SAN and the negative lens (2) and the field lens (3) are each made of acryl.

* * * * *